J. P. AVERY.
Heating-Apparatus.

No. 202,776. Patented April 23, 1878.

Witnesses:
Alexander Mahon
John G. Center

Inventor:
John P. Avery
by A. M. Smith, Atty

UNITED STATES PATENT OFFICE.

JOHN P. AVERY, OF NORWICH, CONNECTICUT, ASSIGNOR OF ONE-HALF HIS RIGHT TO ANSEL CLARK, OF SAME PLACE.

IMPROVEMENT IN HEATING APPARATUS.

Specification forming part of Letters Patent No. 202,776, dated April 23, 1878; application filed February 4, 1878.

*To all whom it may concern:*

Be it known that I, JOHN P. AVERY, of Norwich, county of New London, State of Connecticut, have invented certain new and useful Improvements in Heating Apparatus, of which the following is a full, clear, and exact description, reference being had to the accompanying drawing, making part of this specification, in which—

Figure 1:
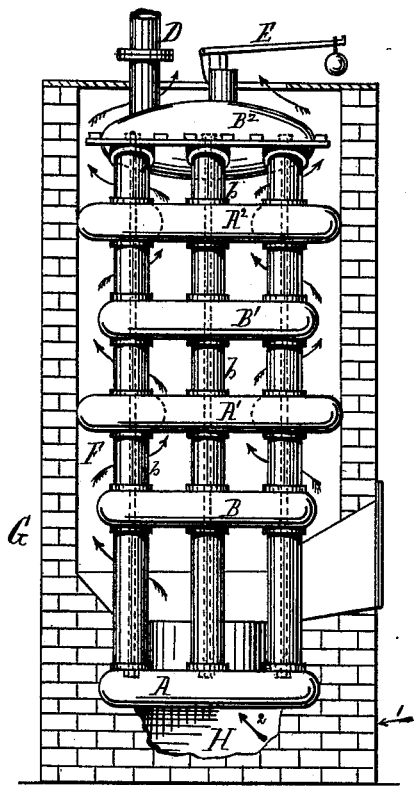
Figure 2:
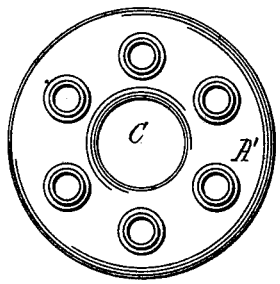
Figure 3:
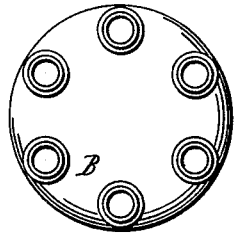
Figure 4:
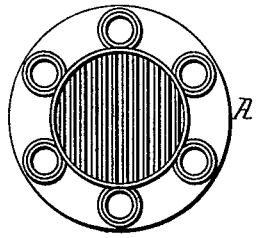

Figure 1 represents a vertical section through my improved heater. Fig. 2 is a plan view of one of the annular drums or chambers. Fig. 3 is a similar view of one of the closed chambers, alternating with the annular chambers; and Fig. 4 is a plan view of the hollow annular cylinder or chamber forming the fire-pot.

Similar letters of reference denote corresponding parts wherever used.

My invention relates to a novel construction and arrangement of heater-chambers, having for its object a more thorough utilization of the heat from the rising products of combustion; and it consists in providing the heater with chambers made in circular or other form, and alternately open and closed in the center, or, in other words, the one made in the form of a hollow ring, with an opening through the center, for the products of combustion to pass through, and the alternate chambers made similar in form, but without the central opening and of less diameter, for permitting the products of combustion to pass up around or outside of the chamber, as hereinafter described.

In the accompanying drawings, A A$^1$ A$^2$ represent a series of hollow annular chambers or drums, made with an opening through the center, as shown in Fig. 2. The lower one, A, may, if desired, be made in the form of a hollow annular or double cylinder, of a depth sufficient to form the wall of the fire-pot, and to the lower end of this cylinder the grate-bars $a$ may be applied, as shown in Fig. 4, in any convenient or suitable manner, said cylinder in a steam-heater constituting a water-jacket around the fire.

B B$^1$ B$^2$ represent a second series of chambers or drums, arranged to alternate with the chambers, and conforming in external configuration to the form of chambers A A$^1$ A$^2$, but of less diameter and without the central perforation or opening C. The chambers A B, thus arranged, are connected by a series of short upright pipes or tubes, $b$, and serve to cause the rising products of combustion to pass alternately around or outside of and up centrally through them, as indicated by the arrows, Fig. 1.

The upper one, B$^2$, of these may be made of greater depth than B B$^1$, if desired, giving it the form of a steam-dome, from which the heater-pipes D may lead or be conducted to any required point, and, in case water or steam is used for heating purposes, it may also be supplied with any usual or preferred form of safety-indicator, as shown at E.

The heater thus constructed is placed within a chamber, F, the walls G of which may be of brick or metal, as preferred, and according to whether it is desired to make the heater, as a whole, portable or otherwise, and from this chamber the rising products of combustion can be conducted to any suitable point of escape.

Air is admitted to the fire through the ash-pit door and ash-pit H, as indicated by the arrows 1 and 2, Fig. 1, and thence, with the rising products of combustion, follows the route indicated.

In practice, the walls G of the fire-pot or chamber are brought into close proximity with the external face or periphery of the larger chambers A A$^1$ A$^2$, as shown, for compelling the products of combustion to pass through the central openings therein, as described.

It will be apparent that while the arrangement described is particularly adapted to heating by water or steam, it is not necessarily confined thereto, as air may be readily admitted to the lower drum A, and, becoming heated, will pass up thence through the series of drums and connecting-pipes, and can thus be used as the heating medium. Where water or steam is employed, the drum A will be provided with the necessary supply pipe or pipes, penetrating the wall G; and, if desired, circulating pipes may be employed, connecting the upper and lower chambers.

I would state that I am aware that annular drums have been employed, surrounding a central magazine, with passages for the products of combustion alternately at the centers, around said magazine, and at the sides, around outside of the annular drums; also, that alternate annular and centrally-closed drums of uniform diameters, and removed from the walls of the inclosing-chamber, have been used, and I therefore do not claim these parts broadly and irrespective of their arrangement; but

Having now described my invention, what I claim as new, and desire to secure by Letters Patent, is—

The two sets or series of heating-drums, A A', B B', those of one series being made annular and of a diameter to fit snugly against the walls of the combustion-chamber, and having an unobstructed central opening; the other of less diameter than the combustion-chamber, and made in a closed cylindrical form or with the closed centers, the two being connected by vertical pipes or flues, and having the alternate arrangement shown and described.

JOHN PORTER AVERY.

Witnesses:
ANSEL CLARK,
S. T. HOLBROOK.